Feb. 18, 1930.  T. A. O'NEIL  1,747,258
AIR SHOVEL
Filed Dec. 31, 1927

Thomas A. O'Neil INVENTOR
BY
Frank Abut ATTORNEY

Patented Feb. 18, 1930

1,747,258

UNITED STATES PATENT OFFICE

THOMAS A. O'NEIL, OF CLIFTON, ARIZONA

AIR SHOVEL

Application filed December 31, 1927. Serial No. 243,835.

This invention relates to a shovel designed for handling concentrates, ores, dredgings, or any material of such a consistency that it has a tendency to cling together and to the walls of any container in which it might be placed.

An object of the invention is to provide a shovel in which provision is made for delivering a stream of compressed air from the leading edge of the shovel, this stream of air operating to break up the clinging material in such a manner that it may readily be handled by the shovel.

While a preferred embodiment of the invention has been disclosed for purposes of illustration, it should be understood that various changes may be made in the structure without departing from the spirit and scope of the invention hereinafter set forth and claimed.

Figure 1:
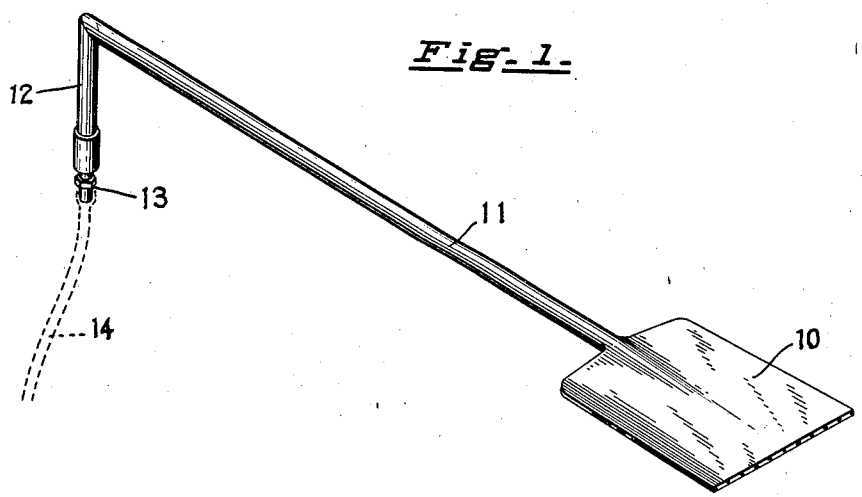
Fig. 1 is a perspective view of a shovel embodying the invention.
Figure 2:
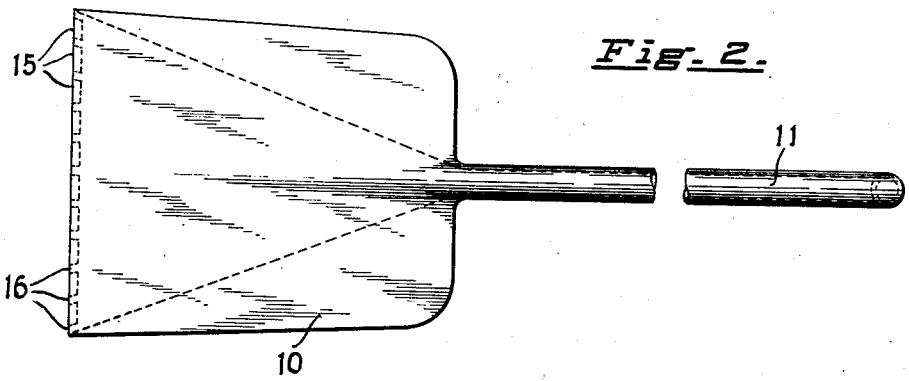
Fig. 2 is a plan view of the shovel.
Figure 3:
Fig. 3 is an elevation of the shovel taken looking from the left side of Fig. 2.

Referring to the drawings more particularly, it will be seen that the shovel comprises a flat hollow blade 10 which may be formed by welding together two suitably shaped pieces of sheet steel. A section of steel tubing 11 is secured to the blade to form the handle of the shovel, and a short, piece 12 of tubing is welded to the outer end of handle 11 and extends downwardly. The lower end of piece 12 is provided with a nipple 13 for the attachment of a suitable source of air under pressure. A plurality of blocks 15 are arranged in spaced relation between the front edges of the two sides of the shovel, forming a plurality of air openings 16 along the cutting edge of the shovel.

It will be clear from the above disclosure, that when air under pressure is led from hose 14 into the handle 11 it will issue from the point of the shovel through the openings 16. When the shovel is inserted in the material to be moved, the air, issuing from the shovel point under high pressure, separates and breaks up the clinging material in such a manner that it will readily move. After the main mass of material has been moved, the shovel also serves as a tool for cleaning the material from corners and crevices where it might have lodged, the air issuing from the shovel-point readily dislodging such material.

The idea embodies, in suitable form, the combination of a hollow handle attached to a hollow shovel blade in such a manner that compressed-air led into the handle through a suitable connection will issue from openings in the shovel point as shown on the drawing, the object of the shovel form being to facilitate the insertion of the tool in the material to be moved and to give effective distribution of the air stream.

The shovel described herein is particularly adapted for unloading copper concentrates. By use of these shovels the size of the unloading crew has been cut to half, or less, of that formerly used and the unloading operation much expedited. In a test one man using the compressed-air shovel, with air at about 75 lb. pressure, unloaded and thoroughly cleaned a car containing forty-five wet tons of concentrate in seven minutes, including one spotting of the car.

Under regular routine operating conditions where two men unload a string of from six to ten cars of concentrate, the time for the two men averages ten minutes per car, exclusive of spotting, making the labor cost for unloading, including thorough cleaning of the car, about one-third of a cent per wet ton. The concentrate handled is about 60 per cent flotation and 40 per cent sand, and contains 9 to 11 per cent moisture and 22 per cent copper. On account of its high copper content particular attention is paid to thorough cleaning of the cars, to prevent loss in transit when they are returned to the concentrator.

I claim:

1. A shovel having a hollow blade and an aperture in the front edge of the blade, and means for supplying air under pressure to the blade.

2. A shovel having a hollow blade and a plurality of apertures in the front edge of the blade, said apertures leading to the hollow interior of the blade, and means for supplying air under pressure to the interior of the blade.

3. A shovel having a blade formed with a passage leading therethrough, the blade having an aperture extending through the front edge of the blade and in communication with the passage, and means for supplying air under pressure to the passage in the blade.

4. A shovel having a blade formed with a passage leading therethrough, the blade having a narrow aperture extending through the front edge of the blade, practically coextensive with the blade width and in communication with the passage, a hollow handle in communication with the passage, and means for supplying air under pressure to the hollow handle.

5. A shovel having a blade formed with a passage leading therethrough, the blade having a plurality of apertures extending through the front edge of the blade and in communication with the passage, a hollow handle in communication with the passage, and means for supplying air under pressure to the handle.

6. A shovel having a hollow blade formed by connecting two pieces of sheet material together along certain of their edges, a plurality of spacing blocks separating the pieces along the leading edge of the blade, the blocks being spaced apart to provide a plurality of apertures extending through the leading edge and in communication with the interior of the blade, a piece of tubing secured to the blade and in communication with the interior of the blade, and means for supplying air under pressure to the handle.

7. A shovel having a hollow blade and an aperture in the front edge of the blade.

8. A shovel having a hollow blade and a plurality of apertures in the front edge of the blade, said apertures leading to the hollow interior of the blade.

9. A shovel having a blade formed with a passage leading therethrough, the blade having an aperture extending through the front edge of the blade and in communication with the passage.

10. A shovel having a blade formed with a passage leading therethrough, the blade having an aperture extending through the front edge of the blade and in communication with the passage, and a hollow handle in communication with the passage.

11. A shovel having a blade formed with a passage leading therethrough, the blade having a plurality of apertures extending through the front edge of the blade and in communication with the passage, and a hollow handle in communication with the passage.

12. A shovel having a hollow blade formed by connecting two pieces of sheet material together along certain of their edges, a plurality of spacing blocks separating the pieces along the leading edge of the blade, the blocks being spaced apart to provide a plurality of apertures extending through the leading edge and in communication with the interior of the blade, and a piece of tubing secured to the blade and in communication with the interior of the blade.

In testimony whereof I affix my signature.

THOMAS A. O'NEIL.